(12) United States Patent
Sedarat et al.

(10) Patent No.: US 10,148,508 B1
(45) Date of Patent: Dec. 4, 2018

(54) METHOD AND SYSTEM FOR ETHERNET TRANSCEIVER RATE CONTROL

(71) Applicant: Aquantia Corporation, Milpitas, CA (US)

(72) Inventors: Hossein Sedarat, San Jose, CA (US); Paul Langner, Fremont, CA (US); Ramin Farjadrad, Los Altos, CA (US); Kamal Dalmia, Fremont, CA (US)

(73) Assignee: Aquantia Corp., Milpitas, CA (US)

( * ) Notice: Subject to any disclaimer, the term of this patent is extended or adjusted under 35 U.S.C. 154(b) by 339 days.

(21) Appl. No.: 14/459,260

(22) Filed: Aug. 13, 2014

Related U.S. Application Data

(60) Provisional application No. 61/865,810, filed on Aug. 14, 2013, provisional application No. 61/944,829, filed on Feb. 26, 2014.

(51) Int. Cl.
*H04L 29/06* (2006.01)
*H04L 12/24* (2006.01)

(52) U.S. Cl.
CPC ...... *H04L 41/0889* (2013.01); *H04L 41/0809* (2013.01); *H04L 41/0866* (2013.01)

(58) Field of Classification Search
None
See application file for complete search history.

(56) References Cited

U.S. PATENT DOCUMENTS

| 8,320,411 | B1 | 11/2012 | Sedarat | |
|---|---|---|---|---|
| 9,130,695 | B1 | 9/2015 | Dalmia | |
| 2007/0076722 | A1* | 4/2007 | Ungerboeck | H04L 12/403 370/395.2 |
| 2011/0249686 | A1* | 10/2011 | Langner | H04L 1/0002 370/465 |
| 2012/0063295 | A1* | 3/2012 | Bliss | H04L 1/0001 370/216 |
| 2014/0258813 | A1* | 9/2014 | Lusted | H04L 1/004 714/776 |

* cited by examiner

*Primary Examiner* — Yemane Mesfin
*Assistant Examiner* — Jeff Banthrongsack
(74) *Attorney, Agent, or Firm* — Lance Kreisman; Peninsula Patent Group

(57) ABSTRACT

A method of signaling between Ethernet transceivers along a link is disclosed. The method includes advertising first and second supported data rates between the transceivers during an autonegotiation sequence. The link is then trained to train transceiver operating parameters with a training sequence of symbols. The training includes initiating the training sequence to support the first data rate, determining whether the link can operate at the first data rate, and transferring control information requesting a retrain at a second data rate different than the first data rate if the link cannot support the first data rate. The link is retrained, in response to the control information, to train the parameters for operation at the second data rate. The retraining is carried out without repeating the autonegotiation sequence. The link is then operated in a data transfer mode at the second data rate.

20 Claims, 4 Drawing Sheets

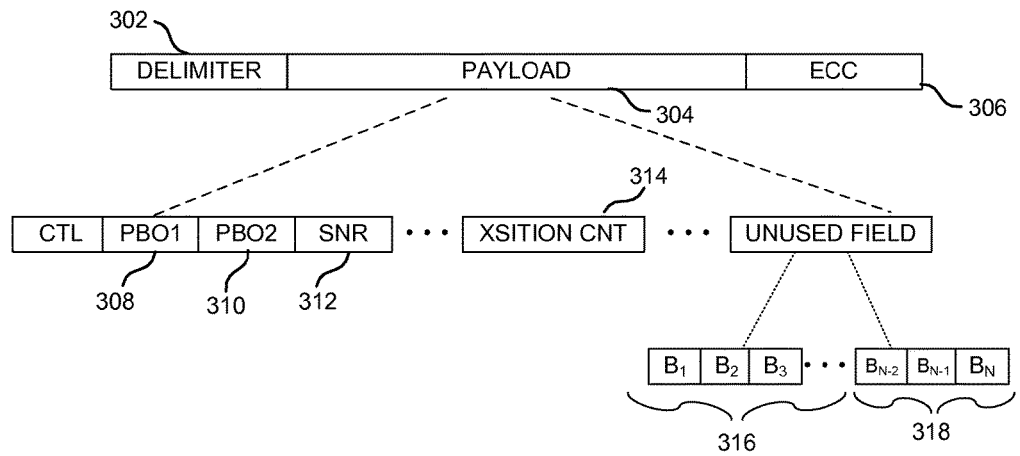

| | Bit 2 | Bit 1 | Bit 0 | Priority | Requested Action |
|---|---|---|---|---|---|
| 410 | 1 | 1 | 1 | 7 | Restart from autonegotiation |
| 412 | 1 | 1 | 0 | 6 | Retrain at 1.0 Gbps |
| 414 | 1 | 0 | 1 | 5 | Retrain at 2.5 Gbps (not allowed if 2.5 Gbps is not advertise in autoneg by both link partners) |
| 416 | 1 | 0 | 0 | 4 | Retrain at 5.0 Gbps (not allowed if 5.0 Gbps is not advertise in autoneg by both link partners) |
| 418 | 0 | 1 | 1 | 3 | Retrain at 10 Gbps |
| 420 | 0 | 1 | 0 | 2 | Repeat fast retrain (not allowed in normal training) |
| | 0 | 0 | 1 | 1 | Reserved |
| 422 | 0 | 0 | 0 | 0 | Continue with normal flow of training |

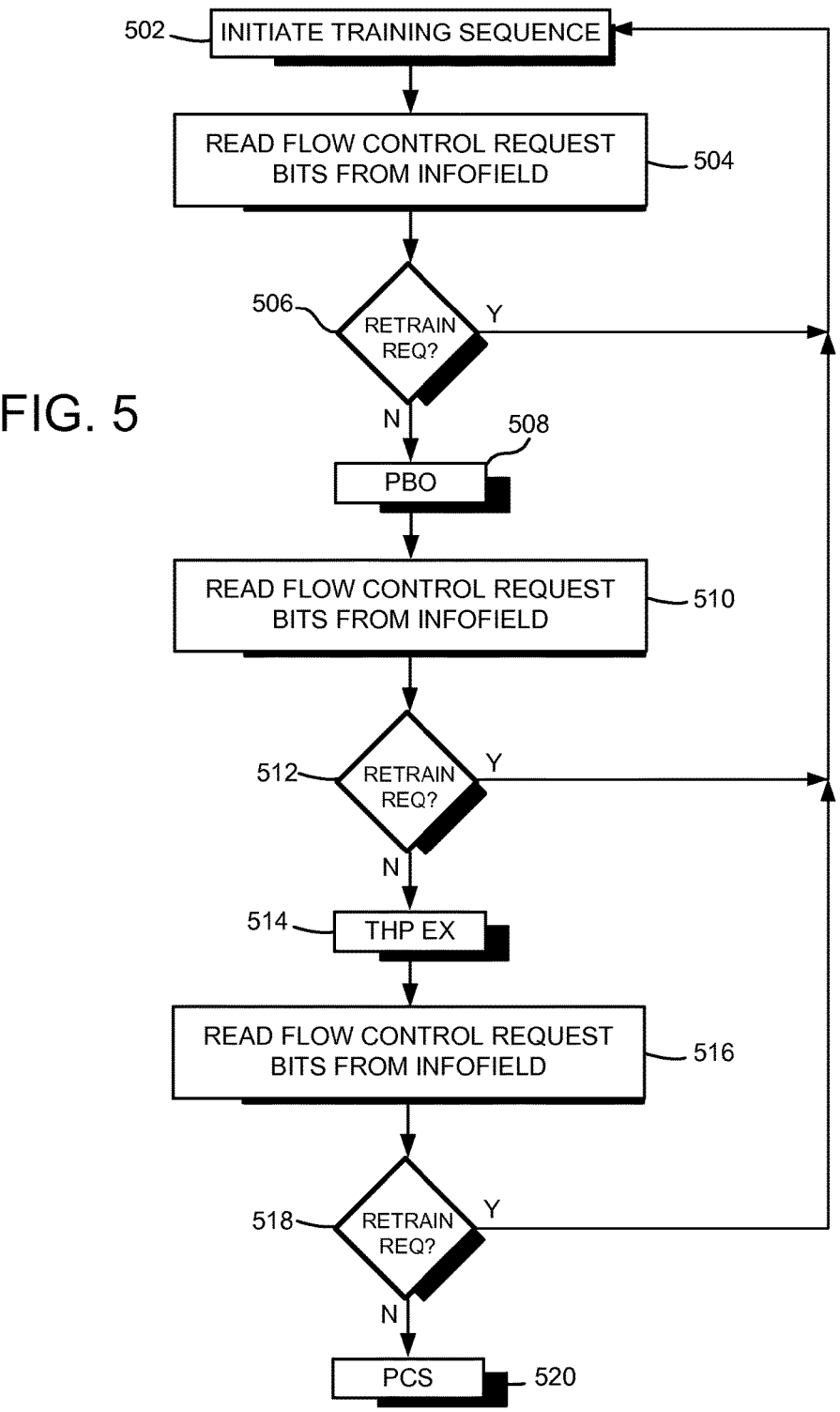

US 10,148,508 B1

METHOD AND SYSTEM FOR ETHERNET TRANSCEIVER RATE CONTROL

RELATED APPLICATION(S)

This application claims benefit of priority to Provisional U.S. Patent Application No. 61/865,810, titled "High-Speed Ethernet Transceiver With Sub-Rate Modes", filed Aug. 14, 2013, and Provisional U.S. Patent Application No. 61/944, 829, titled "High-Speed Ethernet Transceiver With Sub-Rate Modes", filed Feb. 26, 2014, the aforementioned priority applications being hereby incorporated by reference in their entirety.

TECHNICAL FIELD

The disclosure herein relates to electronic communications, and more particularly to the operation of transceivers used for transmission and reception of data in communication networks.

BACKGROUND

Ethernet is a communication standard that provides compatibility with several different data rate sub-standards that are suitable for different network bandwidths. Each generation of Ethernet typically provides a default data rate that is many orders of magnitude higher than a prior generation. The supporting communications infrastructure, such as cable and/or other media to transport signals, often lags behind the new generation, and may not be able to support the higher data rates. Reverse compatibility with older generation data rates is thus important.

While legacy compatibility for Ethernet enables new generation hardware to function with older infrastructure, the gap between the legacy data rates and new generation default data rates may be significant. For example, Ethernet transceivers that have the capability to operate at 10 Gb/s may need to operate at one-tenth that rate, to 1 Gb/s, as the next highest supported data rate. In many cases, while a given infrastructure may be unable to support a full 10 Gb/s data rate, the infrastructure may still be able to support a rate that far exceeds 1 Gb/s.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 3 illustrates one embodiment of an Infofield frame utilized in the method of FIG. 3.

FIG. 4 illustrates one embodiment of bit configurations for identifying Training Requests in the InfoField frames of FIG. 3.

FIG. 5 illustrates a flowchart of steps showing further detail of a specific training sequence for use in the method of FIG. 2.

DETAILED DESCRIPTION

Embodiments of communications systems and corresponding methods are disclosed herein. One embodiment of a method of signaling between Ethernet transceivers along a link is disclosed. The method includes advertising first and second supported data rates between the transceivers during an autonegotiation sequence. The link is then trained to train transceiver operating parameters with a training sequence of symbols. The training includes initiating the training sequence to support the first data rate, determining whether the link can operate at the first data rate, and transferring control information requesting a retrain at a second data rate different than the first data rate if the link cannot support the first data rate. The link is retrained, in response to the control information, to train the parameters for operation at the second data rate. The retraining is carried out by terminating the first training attempt prematurely and without repeating the autonegotiation sequence. The link is then operated in a data transfer mode at the second data rate. By carrying out the autonegotiation sequence and training in this manner, the time to achieve an operable data link may be significantly reduced.

In a further embodiment, a system for establishing a link between Ethernet transceivers is disclosed. The system includes one or more circuits of a transceiver operable to advertise first and second supported data rates between the transceivers during an autonegotiation sequence. One or more circuits of the transceiver are operable to train the link to train transceiver operating parameters with a training sequence of symbols. The one or more circuits operable to train the link include one or more circuits operable to initiate the training sequence to support the first data rate, determine whether the link can operate at the first data rate, and transfer control information requesting a retrain at a second data rate if the link cannot support the first data rate. One or more circuits of the transceiver are operable to retrain the link, in response to the control information, to train the parameters for operation at the second data rate. The retraining is carried out without repeating the autonegotiation sequence and without repeating the entire training sequence. One or more circuits of the transceiver are operable to operate the link in a data transfer mode at the second data rate.

Figure 1:
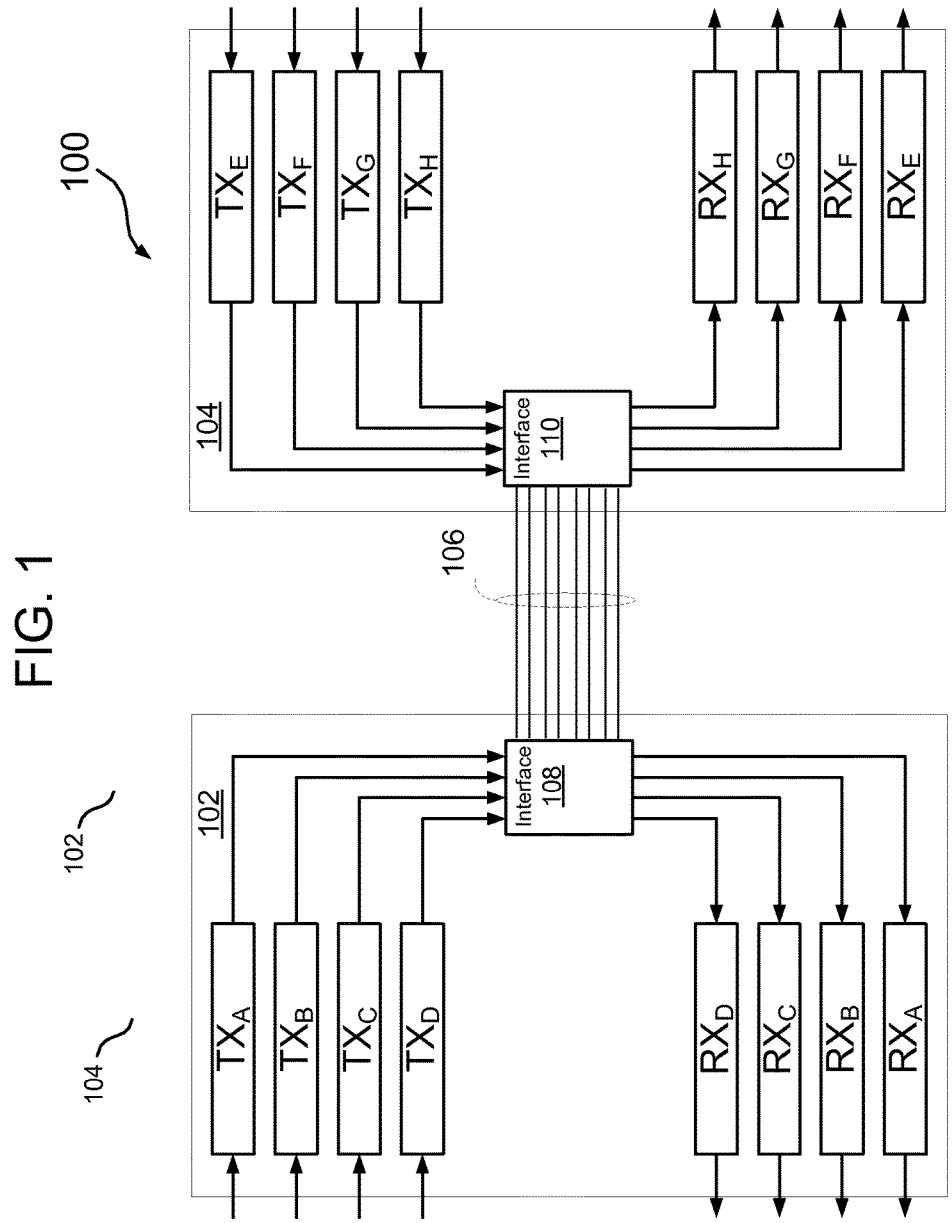
FIG. 1 illustrates one embodiment of a communication system in the form of an Ethernet link.

FIG. 1 is a block diagram illustrating one embodiment of a communication system 100. The system includes a first transceiver 102 and a second transceiver 104 that can communicate with each other. The first transceiver 102 includes "transceiver components" including one or more transmitters TXA-TXD and one or more receivers RXA-RXD. Similarly, the second transceiver 104 includes various transceiver components including one or more transmitters TXE-TXH and one or more receivers RXE-RXH. The transmitters TXA-TXH shown in FIG. 1 can be considered individual "transmitters," as typically referenced herein, or can be considered individual transmitter channels which a transmitter block within the transceiver can independently transmit signals on. Similarly, receivers RXA-RXH can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver that want to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver 102 can communicate with the second transceiver 104 over one or more communication channels of a communication link 106. In one embodiment, such as that corresponding to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver 102 and an interface 110 can be provided in the second transceiver 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

The communication link 106 may take the form of various cable media such as unshielded twisted pair cable meeting various standards, such as CAT-5e, CAT-6, CAT-6a, CAT-7 and so forth. The different cable standards have correspondingly different channel characteristics that may affect signal quality over long distances. The communication system 100 of FIG. 1 accounts for the type of cable used, among other things, by carrying out a unique autonegotiation and training procedure, as more fully described below.

Figure 2:
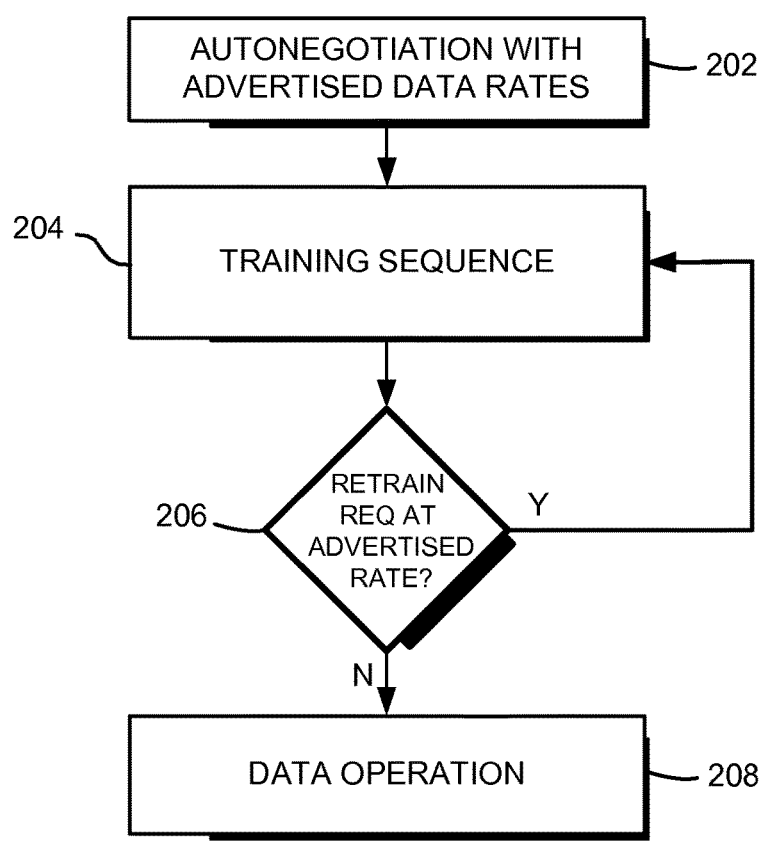
FIG. 2 illustrates one embodiment of a method of establishing communication between the Ethernet transceivers of FIG. 1.

FIG. 2 illustrates a flowchart of high-level steps employed by one embodiment of a method that may be carried out to set up the communications system 100 for operation. For one specific embodiment, the communications system employs transceivers that are capable of transmitting and receiving data at 10 Gbps, and compatible with 10GBASE-T Standards. Initializing the link generally begins with an autonegotiation process, at 202. The autonegotiation process allows the transceivers at each end of the link to advertise their capabilities, such as speed, transceiver type, half or full duplex, etc. Further, the autonegotiation process may automatically select the operating mode for communication on the link.

For one specific embodiment, the autonegotiation advertising identifies data rate capabilities, such as the default 10 Gbps mode, and the conventional "down-shift" from 10 Gbps to 1 Gbps (1GBASE-T). Other "sub-rate" modes may also be advertised, such as a 5 Gbps mode and/or a 2.5 Gbps mode. The sub-rate modes may be advertised in the 10GBASE-T extended next page (XNP) (IEEE 802.3-2008 Table 55-11) in bits U31:U29, respectively. Autonegotiation typically takes a few seconds to carry out.

Following autonegotiation, the link undergoes training, at 204. In general, the training involves transmitting and receiving sequences of symbols to verify certain operating parameters at the highest advertised data rate between the link partners. For example, the training procedure may include establishing initial synchronization, setting transmit power levels, adjusting echo and near-end crosstalk filters, adjusting equalizers, selecting precoder coefficients, and so forth. If, during training, the link fails or cannot operate at the highest rate, then one or more retrain requests to, for example, "downshift" to a lower sub-rate, may be generated and passed between the link partners via InfoFields, as more fully explained below. Once the retrain request(s) is detected, at 206, then the training process begins again, but without having to re-perform the autonegotiation process. Once the training process is complete, the link may go online for data operations, at 208.

FIG. 3 illustrates an InfoField for use in the method of FIG. 2. Generally, InfoFields are used for exchanging parameters and control information between the link partners. The data structure for the InfoField includes a delimiter, at 302, followed by a payload, at 304. The entire field is error-protected by ECC bits, at 306. The payload 304 may include various types of control information, such as initial power backoff values, at 308, requested power backoff levels, at 310, SNR margin in the receiver, at 312, and a transition counter, at 314, to name but a few.

Further referring to FIG. 3, the transition counter field 314 includes a multi-bit value 316 that represents a number of frames left before a change or transition in the training sequence occurs. For example, if the training is currently in a power back off sub-mode, then the transition count would indicate the number of training frames left until the next training mode takes place (after the power back-off mode). For one specific embodiment, additional bits 318 are employed in the transition counter field to identify one or more requests indicating whether a retrain needs to occur.

FIG. 4 illustrates one specific example of a bit configuration table where the "additional" bits 318 (three bits for one specific embodiment) may be employed in an unused field to code eight possible retrain requests. The number of bits used may vary, depending on the application, to provide the retrain request capability. Built into the coding is a priority value, at 408, that provides a priority mechanism in the event that the requested transition by the 2 sides of the link are different. At 410, a coding of "1-1-1" represents an overall restart from the beginning of the autonegotiation sequence. This request is of the highest priority, and generally indicates a total failure of the link where the additional time to undertake a further autonegotiation is required. The next highest-priority request, at 412, is coded "1-1-0", indicating a retrain of parameters to satisfy a data rate of 1.0 Gbps. This is the conventional legacy sub-rate for 1GBASE-T. If the autonegotiation procedure advertised 2.5 Gbps and/or 5 Gbps sub-rate capabilities, then the next two priority requests, at 414 and 416, indicate respective retrains for the 2.5 Gbps and 5 Gbps data rates. At 418, code "0-1-1" represents a retrain at 10 Gbps. In some instances, a "fast-retrain" may be requested, at 420 with a coding of "0-1-0", where many of the set parameters remain unchanged, allowing for a retrain of only minimal parameters. A default code of "0-0-0", at 422, indicates a continuation of the normal flow of training.

FIG. 5 illustrates further detail involving one specific embodiment of a training procedure consistent with the method of FIGS. 2-4. As explained above, the training process starts after autonegotiation, where a first training sequence of symbols is initiated, at 502. At the receive side of the link, the InfoFields that accompany the training symbols (such as PMA frames) are evaluated in a manner such that the control information from the transition counter can be read, at 504. Any retrain requests coded into the control information are deferred until the transition counter reaches zero. At that time, if a retrain request was received, at 506, then the retraining request having the highest priority is executed, and the training process re-initiated, at 502. Note that the retraining begins without having to go through a new autonegotiation sequence. If no retrain request was received at 506, then the initial training sequence continues.

Further referring to FIG. 5, one embodiment of the training process continues, at 508, with a sequence of training frames transmitted to reveal specific initial power back-off (PBO) settings, and requested power back-off levels to minimize transmit interference. Associated InfoFields are read to gather any flow control requests, at 510. If any requests for a retrain were received, at 512, then the highest priority retrain is carried out to re-initiate the training sequence. For one embodiment, during the power back-off mode, signal-to-noise ratio (SNR) margin is determined by the receive side of the link. The SNR margin may be used as an indicator of link operational quality, and thus may serve as the basis for retrain requests.

If no retrain is requested, at 512, then the training sequence continues with a Tomlinson-Harashima precoder (THP) exchange, at 514. The THP coefficients provide pre-emphasis tap filter values for the transmit precoder portions of each transceiver. As in the other training sub-processes, the InfoFields are monitored for control information indicating a failure in the link, and identifying a retrain request, at 516. At the conclusion of the THP exchange process, and with the transition counter at "0", if any retrain requests were received, the training process is re-initiated, at 502, with the training sequence set to correspond to the highest priority retrain conditions requested.

Further referring to FIG. 5, if no retrain requests were detected, at 518, then the training sequence goes into a PCS test state, at 520. In the PCS test state, the link partners send PCS frames using the final coding and modulation for sending scrambled test data at the requested data rate. While not shown, a retrain may also occur if decoding errors in the transceiver receivers indicate link nonoperability. If the PCS test state succeeds, then normal data at the specified data rate may be transferred between the link partners.

Those skilled in the art will appreciate that the training process described above provides a unique way to adjust Ethernet data rates quickly without having to repeat multiple autonegotiation sequences and with prematurely terminating a training sequence that is cannot be supported for a particular link. This minimizes link downtime, and improves the reliability and data transfer efficiency of the link. Further, the process described above enables for sub-rates that optimize the actual capabilities of the link, rather than settling for lower sub-rates that may be less than optimal.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of signaling between Ethernet transceivers along a link, the link including multiple sub-channels, the method comprising:

advertising first and second supported data rates between the transceivers during an autonegotiation sequence, the first supported data rate comprising a first supported aggregate data rate of the multiple sub-channels, the second supported data rate comprising a second supported aggregate data rate of the multiple sub-channels;

training the link to train transceiver operating parameters with a training sequence of symbols, the training includes
initiating the training sequence to support the first data rate,
determining whether the link can operate at the first data rate, and
transferring control information requesting a retrain at a second data rate different than the first data rate if the link cannot support the first data rate;

retraining the link, in response to the control information, to train the parameters for operation at the second data rate, the retraining carried out without repeating the autonegotiation sequence; and operating the link in a data transfer mode at the second data rate.

2. The method according to claim 1, wherein the control information is transferred in a transition count field of an InfoField.

3. The method according to claim 2, wherein the transition count field includes:
a count value representing a number of frames until a transition training event occurs; and
request bits identifying a retraining request.

4. The method according to claim 3, wherein the retraining occurs in response to detecting the retraining request.

5. The method according to claim 4, wherein a plurality of training requests are detected, and a given request is selected based on a priority value.

6. The method according to claim 5, wherein the priority value is coded into the request bits.

7. The method according to claim 2, wherein the retraining is responsive to the transition count reaching a "zero" value.

8. A system for establishing a link between Ethernet transceivers, the link including multiple sub-channels, the system comprising:
one or more circuits of a transceiver operable to advertise first and second supported data rates between the transceivers during an autonegotiation sequence, the first supported data rate comprising a first supported aggregate data rate of the multiple sub-channels, the second supported data rate comprising a second supported aggregate data rate of the multiple sub-channels;
one or more circuits of the transceiver operable to train the link to train transceiver operating parameters with a training sequence of symbols, the one or more circuits operable to train the link including one or more circuits operable to
initiate the training sequence to support the first data rate,
determine whether the link can operate at the first data rate, and
transfer control information requesting a retrain at a second data rate different than the first data rate if the link cannot support the first data rate;

one or more circuits of the transceiver operable to retrain the link, in response to the control information, to train the parameters for operation at the second data rate, the retraining carried out without repeating the autonegotiation sequence; and
one or more circuits of the transceiver operable to operate the link in a data transfer mode at the second data rate.

9. The system according to claim 8, wherein the control information is transferred in a transition count field of an InfoField.

10. The system according to claim 9, wherein the transition count field includes:
a count value representing a number of frames until a transition training event occurs; and
request bits identifying a retraining request.

11. The system according to claim 10, wherein the one or more circuits operable to retrain the link carry out the retraining in response to detecting the retraining request.

12. The system according to claim 11, wherein a plurality of training requests are detected, and a given request is selected based on a priority value.

13. The system according to claim 12, wherein the priority value is coded into the request bits.

14. The system according to claim 8, wherein the retraining is responsive to the transition count reaching a "zero" value.

15. A method for setting up transceivers of an Ethernet link, the link including multiple sub-channels, the method comprising:
advertising first and second supported data rates between the transceivers during an autonegotiation sequence, the first supported data rate comprising a first supported aggregate data rate of the multiple sub-channels, the second supported data rate comprising a second supported aggregate data rate of the multiple sub-channels;
formatting physical medium attachment (PMA) training frames corresponding to the first supported data rate, wherein each training frame includes a control information field, the control information field to identify a retraining request corresponding to the second supported data rate in response to detecting an inability of the link to operate at the first supported data rate; and
retraining the link, in response to a retraining request, to train the parameters for operation at the second supported data rate, the retraining carried out without repeating the autonegotiation sequence.

16. The method according to claim 15, wherein the control information is transferred as a count value in a transition count field of an InfoField.

17. The method according to claim 15, wherein a plurality of training requests are detected, and a given request is selected based on a priority value.

18. The method according to claim 17, wherein the priority value is coded into the request bits.

19. The method according to claim 16, wherein the retraining is responsive to the transition count value reaching a "zero" value.

20. The method according to claim 15, wherein the first data rate is the highest supported data rate identified in the autonegotiation sequence, and the second data rate is lower than the first data rate.

* * * * *